US012643528B2

(12) United States Patent
Cashen et al.

(10) Patent No.: US 12,643,528 B2
(45) Date of Patent: Jun. 2, 2026

(54) ENGINE BRAKE CONTROL SYSTEM

(71) Applicant: FCA US LLC, Auburn Hills, MI (US)

(72) Inventors: Daniel P Cashen, Auburn Hills, MI (US); Emily A Robb, Auburn Hills, MI (US); Esaias A Pech, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 10 days.

(21) Appl. No.: 18/789,766

(22) Filed: Jul. 31, 2024

(65) Prior Publication Data

US 2026/0034975 A1 Feb. 5, 2026

(51) Int. Cl.
B60W 10/18 (2012.01)

(52) U.S. Cl.
CPC ......... B60W 10/18 (2013.01); B60W 2520/10 (2013.01); B60W 2552/15 (2020.02)

(58) Field of Classification Search
CPC ............. B60W 10/18; B60W 2520/10; B60W 2552/15; B60T 7/22
See application file for complete search history.

(56) References Cited

U.S. PATENT DOCUMENTS

| | | | |
|---|---|---|---|
| 6,269,298 B1 * | 7/2001 | Seto ................... | B60K 31/0008 |
| | | | 701/96 |
| 10,173,681 B2 * | 1/2019 | Baum ................. | B60W 40/076 |
| 10,293,833 B2 * | 5/2019 | Yamaoka ................. | G08G 1/16 |
| 2017/0297573 A1 * | 10/2017 | Fraser ...................... | B60T 7/22 |
| 2024/0270219 A1 * | 8/2024 | Alenius ........... | B60W 30/18109 |

* cited by examiner

*Primary Examiner* — George C Jin
(74) *Attorney, Agent, or Firm* — Jeremy J. Klobucar

(57) ABSTRACT

A method and system of controlling engine braking in a vehicle, include determining that an accelerator input is not being activated, determining at least one vehicle condition, determining at least one path of travel condition of a road on which the vehicle is traveling, and applying an engine brake as a function of the at least one vehicle condition and the at least one path of travel condition.

19 Claims, 2 Drawing Sheets

ENGINE BRAKE CONTROL SYSTEM

FIELD

The present disclosure relates to control of engine braking in a vehicle.

BACKGROUND

Engine braking can be used in some vehicles to control vehicle speed when a driver is not accelerating the vehicle. However, a driver sometimes does not prefer the vehicle to be slowed, at least not at the rate caused by the engine brake, and may instead prefer a lesser magnitude of engine brake or no engine braking, such as when the driver desires to coast the vehicle along a portion of a road being traveled. Improvements to the application of engine braking are needed.

SUMMARY

In at least some implementations, a method of controlling engine braking in a vehicle, includes determining that an accelerator input is not being activated, determining at least one vehicle condition, determining at least one path of travel condition of a road on which the vehicle is traveling, and applying an engine brake as a function of the at least one vehicle condition and the at least one path of travel condition.

In at least some implementations, the at least one path of travel condition is one or more of distance to a brake event, slope of the road the vehicle currently is on and slope of the road ahead of the vehicle. In at least some implementations, the at least one vehicle condition is one or more of vehicle speed, vehicle weight, and approximate weight of a trailer if the vehicle is towing a trailer. In at least some implementations, a magnitude of engine braking is greater when the vehicle is on an incline than when the vehicle is on a decline.

In at least some implementations, the at least one vehicle condition is one or more of vehicle speed, whether a brake input is being actuated or not, vehicle weight, and approximate weight of a trailer if the vehicle is towing a trailer.

In at least some implementations, a magnitude of engine braking is less when the vehicle is at a greater distance to a braking event than when the vehicle is at a lesser distance to a braking event.

In at least some implementations, the magnitude is zero when the distance to a braking event is greater than a distance threshold. In at least some implementations, the distance threshold changes as a function of the vehicle speed.

In at least some implementations, the method includes determining actuation of a brake input and then applying the engine brake to assist in slowing down the vehicle.

In at least some implementations, the method includes predicting an intended vehicle speed over a predetermined distance along a road to be traveled and controlling the engine brake as a function of the current vehicle speed and the intended vehicle speed. In at least some implementations, the engine brake is not applied when the intended vehicle speed is greater than or equal to the current vehicle speed. In at least some implementations, the engine brake is not applied when the intended vehicle speed is not less than the current vehicle speed by at least a threshold speed difference. In at least some implementations, the intended vehicle speed is compared to a predicted future speed that is based at least in part on the current vehicle speed and the slope of the road to be traveled over the predetermined distance, and wherein the engine brake is applied when the predicted future speed is greater than the intended vehicle speed. In at least some implementations, the intended vehicle speed is determined as a function of the distance to a next brake event along a path of travel of the vehicle.

In at least some implementations, the method also includes detecting actuation of the accelerator or a user actuated brake and then ceasing application of the engine brake.

In at least some implementations, a system, includes one or more vehicle sensors, a control system that includes at least one electronic control unit, and memory including programming, the control system being in communication with the one or more vehicle sensors. The programming is arranged to determine that an accelerator input is not being activated, determine at least one vehicle condition, determine at least one path of travel condition of a road on which the vehicle is traveling, and apply an engine brake as a function of the at least one vehicle condition and the at least one path of travel condition.

In at least some implementations, the at least one path of travel condition is one or more of distance to a brake event, slope of the road the vehicle currently is on and slope of the road ahead of the vehicle.

In at least some implementations, the at least one vehicle condition is one or more of vehicle speed, whether a brake input is being actuated or not, vehicle weight, and approximate weight of a trailer if the vehicle is towing a trailer. In at least some implementations, the magnitude of engine braking is greater when the vehicle is on an incline than when the vehicle is on a decline, and wherein the magnitude of engine braking is less when the vehicle is at a greater distance to a braking event than when the vehicle is at a lesser distance to a braking event.

In at least some implementations, the programming is also arranged to predict an intended vehicle speed over a predetermined distance along a road to be traveled and to control the engine brake as a function of the current vehicle speed and the intended vehicle speed.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
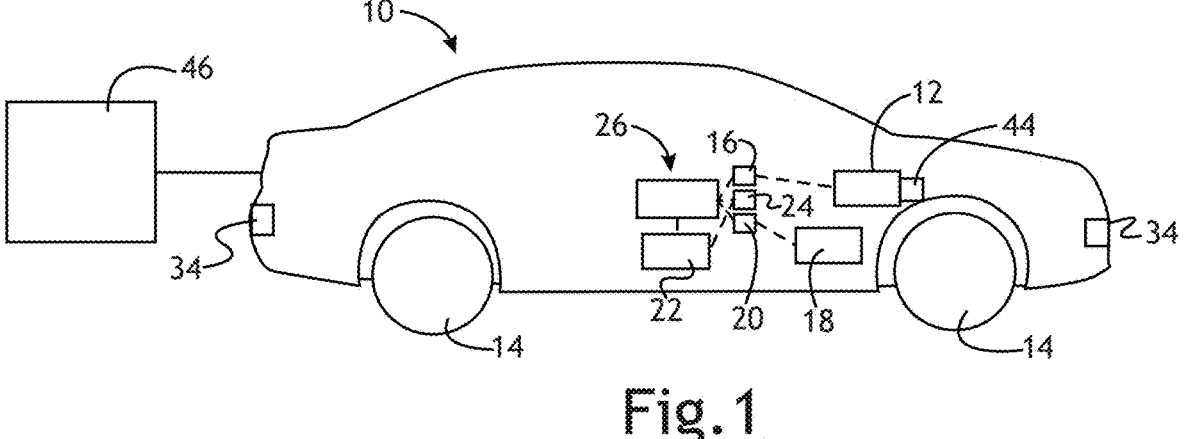
FIG. 1 is a diagrammatic view of a vehicle including a control system 26 and various systems and sensors.

Referring in more detail to the drawings, FIG. 1 illustrates a vehicle 10 having a prime mover 12 that is part of a powertrain that is coupled to vehicle wheels 14 through a suitable drivetrain to propel the vehicle 10. The prime mover 12 may be an internal combustion engine, one or more electric motors, or both as in a hybrid powertrain. The prime mover 12 may be controlled by a driver via an accelerator input 16 (e.g. a foot-actuated accelerator pedal) to control the rate of vehicle acceleration and the vehicle speed. The vehicle 10 includes a brake system 18 to slow and stop the vehicle 10, and the brake system 18 may be controlled by a driver via a brake input 20 (e.g. a foot-actuated brake pedal). The brake system 18 may be a friction brake system 18 including brake pads or shoes selectively frictionally engaged with rotors or drums associated with the vehicle wheels 14 to resist rotation of the wheels 14. Further, to control the direction of travel, the vehicle 10 includes a steering system 22 that may be controlled by a drive via a steering input 24 (e.g. a steering wheel). While driver control of the vehicle drive inputs 16, 20, 24 (acceleration, braking and steering) is noted, the vehicle 10 may include semi-autonomous or fully autonomous control of the drive inputs, as desired.

Figure 2:
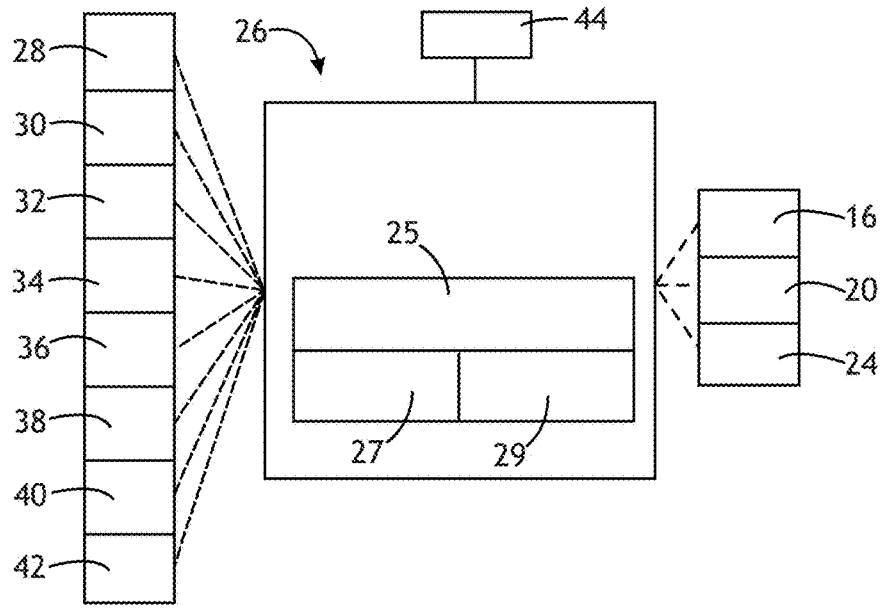
FIG. 2 is a schematic view of the vehicle control system.

The vehicle 10 may include a control system 26 that may include one or more controllers 25 (e.g. processors, electronic control units and the like) having memory 27 and programs/instructions 29 to control various aspects of vehicle operation. As shown in FIG. 2, multiple systems may monitor various vehicle functions, inputs and outputs and provide data to the control system 26. For example, the vehicle 10 may include a speed sensor 28 that provides an indication of vehicle speed, one or more accelerometers 30, ride height sensors 32, object detection sensors 34 (e.g. cameras, radar, lidar, ultrasonic and other sensors), wheel speed sensors 36 that determine a rotary speed of the vehicle wheels 14, fuel system sensors 38 (e.g. fuel injector flow rates), brake sensors 40 (e.g. brake pedal travel sensors), location sensors 42 (e.g. GPS, mapping and navigation systems), and other sensors as is known. Further, the vehicle 10 may include sensors responsive to the presence of a trailer, and in at least some implementations, arranged to detect certain characteristics of the trailer such as the weight and dimensions of the trailer. Such sensors may include but are not limited to the object detection sensors 34.

To control vehicle speed, the vehicle 10 may include an engine brake 44. The engine brake 44 may take many forms and generally involves use of speed retarding forces within or associated with an engine or other prime mover 12 to slow down the vehicle 10. The force provided by the engine brake 44 to reduce the speed of the vehicle 10 can reduce the need to use the vehicle's friction brake system 18, and so can reduce wear and heating of brake pads or shoes of the brake system 18. Further, fuel economy can be improved in at least some circumstances by reducing fuel flow to the engine.

For example, in a gasoline engine, when the accelerator input 16 is not actuated, the fuel supply to the engine can be terminated and a throttle valve closes or nearly closes. This restricts air flow and generates a vacuum or subatmospheric pressure within an intake manifold of the engine which resists movement of pistons in the engine and tends to slow the vehicle 10. Down-shifting a transmission coupled to the engine can increase the engine speed (engine revolutions per minute) and increase the rate of piston movement to increase the engine braking effect of the intake manifold vacuum.

With a diesel engine, exhaust valves can be controlled to create a backpressure from the exhaust to the engine that resists engine piston movement to slow the vehicle 10. In some diesel engines, typically larger engines for large trucks, a compression release engine brake 44 may be used whereby exhaust valves are opened just before the end of the compression stroke to release the compressed gas from the cylinder and slow the vehicle 10. Vehicles having a prime mover 12 including an electric motor may use braking techniques associated with the motor to slow the vehicle 10, generate electrical energy (so-called "regenerative braking") or both.

The vehicle driver might not want the engine braking to be used anytime that the accelerator input 16 is not being actuated. By way of non-limiting examples, a driver may want to cruise or coast for a period of time without applying the accelerator and either gradually slow down or utilize a downhill slope (i.e. decline) in the road on which the vehicle 10 is traveling to maintain or even increase the vehicle speed. In such instances, application of the engine brake 44 to slow the vehicle down may frustrate the driver and force the driver to maintain some actuation of the accelerator input 16, which consumes energy and can reduce the efficiency of travel. In other instances, the driver may want or not notice application of the engine brake 44, such as when the driver intends the vehicle 10 to slow down or does not wish for the vehicle 10 to speed up on a decline. Further, unless the driver intends a significant speed reduction, such as may be desired when a braking event is ahead in the path of travel, as noted below, full application of the engine brake 44 may provide too much deceleration in at least some instances.

The systems and methods set forth herein enable selective and adjustable application of the engine brake 44 that takes into account, for example, at least one path of travel condition and at least one vehicle condition. Path of travel conditions may be based on the portion of the road the vehicle 10 is currently on as well as the road ahead of the vehicle 10. For example, the slope of the section of the road that the vehicle 10 is currently on can affect the current and future speed of the vehicle 10, and the likelihood that the driver will actuate the accelerator input 16 or brake input 20. The slope of the current portion of the road that the vehicle is on can be determined by an accelerometer 30 in the vehicle 10, such as an Inertial Measurement Unit (IMU), or by map data which may be used by the navigation system or other system of the vehicle 10, or by one or more object detection sensors 34 (e.g. camera, radar, lidar, ultrasonic).

Similarly, the slope of the section of the road that the vehicle 10 is going to be on can affect the future speed of the vehicle 10, as well as the likelihood that the operator will actuate a drive input 16, 20, 24 (accelerator, brake or steering). The upcoming road slope can be determined by map data which may be used by the navigation system or other system of the vehicle 10, or by an object detection sensor 34 (e.g. camera, radar, lidar, ultrasonic) which may detect changes in road slope within an operating range or operating distance of these sensors. The map data may provide road slope information for longer distances, and this may be more useful when a destination is known by the system 26 such as by the destination being entered in a navigation program or system of the vehicle 10 or a remote device (e.g. smartphone) coupled to the control system 26 by wired or wireless connection. If a destination is not known, the current direction of travel and map data can be used to determine or predict a path of travel for a certain distance of future travel of the vehicle 10. The total distance used in this analysis can vary as a function of the current vehicle speed and/or the predicted future vehicle speed along the noted portion of the upcoming road/future path. The distance used can also vary as a function of road features along the current road, for example, number of possible turnoff/intersections at which the path may travel and the location of those.

An additional path of travel condition may be a type of road or a type of area in which the road is located. Non-limiting examples of types of roads may include highways or expressways and city roads. Highways and expressways typically have higher speed limits and fewer or no intersections, fewer high angle/sharp turns and fewer features that require significant braking or speed reduction as compared to city roads. City roads often include lower speed limits, intersections where different roads directly cross each other, traffic signals (which may include V2X traffic light systems), high angle/sharp turns, traffic and other features that require significant braking. Thus, the instances of acceleration and braking vary by the type of road and the circumstances at a given point in time. For example, highways and expressways can be clogged with traffic requiring frequent braking and acceleration. Further, the road surface, whether it is paved or not, whether ice or water is or may be present, can all affect travel patterns along the road. The type of road and features along the road, including those that involve braking or brake events, also are path of travel conditions that can be considered by the systems and methods. Navigation/mapping programs and systems can provide essentially real-time traffic and road condition information.

Representative vehicle conditions include the weight of the vehicle 10, vehicle speed, wheel speed(s), whether the accelerator input 16 or brake input 20 is being actuated at any given time, vehicle braking capability, and whether the vehicle 10 is towing an object/trailer 46 (FIG. 1) and if so, the weight of the object/trailer 46 being towed. Vehicle speed may include the current/instantaneous vehicle speed or a rate of change of speed to, for example, indicate if the vehicle 10 is accelerating or decelerating. Vehicle wheel speed can be determined to, for example, detect wheel slippage or other relative movement of the wheels 14 that doesn't match the vehicle speed. The weight of the vehicle 10 may be determined such as by information provided by the vehicle ride height sensors 32, as the weight of the vehicle 10 can affect the vehicle braking, as well as how the vehicle speed changes when traveling on inclines and declines. Similarly, the weight of a trailer 46 can affect the vehicle braking and speed changes on slope. Further, controlled braking with a trailer 46 can be more difficult than with a vehicle by itself, and this can be more difficult as trailer weight increases. The vehicle stopping power or braking ability can also be a vehicle condition considered by the systems and methods, and this can vary as a function of vehicle speed and weight, including a trailer 46 or other towed weight. The vehicle inclination/attitude can also be a vehicle condition, can be determined by one or more sensors such as the IMU or other accelerometer 30, and may denote the slope of the portion of the road the vehicle currently is on, as noted above.

In determining whether to apply the engine brake, and to what extent, one or more vehicle conditions may be determined and one or more travel path conditions may be determined. These determinations may include both current conditions and expected or predicted future conditions. The conditions can be analyzed with regard to whether they tend to favor application of the engine brake 44 or not. That is, whether application of the engine brake is more likely to achieve an acceptable or desired result or not.

Figure 3:
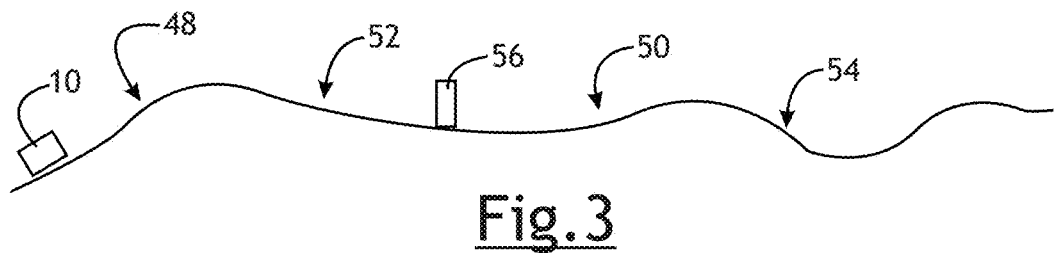
FIG. 3 is a diagrammatic view of the vehicle on a road.

For example, if the vehicle 10 is traveling uphill (e.g. on an incline 48, as shown in part of FIG. 3), this does not favor application of the engine brake 44 as the incline itself will slow the vehicle 10 down. However, if the vehicle speed is much higher than needed and if the incline is of small magnitude, then perhaps application of the engine brake would be desirable. Thus, different levels or ratings can be applied based on the severity or magnitude of the conditions being considered. For example, with an incline, greater or steeper inclines 48 can be given a rating associated with a lower need for application of the engine brake 44 compared to lesser inclines 50. If, instead, the vehicle 10 is traveling downhill, such as on the decline 52 portion shown in FIG. 3, this does favor application of the engine brake 44, at least to the extent that the current vehicle speed is maintained (i.e. to offset acceleration that would otherwise occur when traveling along the downhill road section). As with inclines, different levels or ratings can be applied based on the severity or magnitude of the decline, with greater declines 54 favoring or tending to cause application of the engine brake 44 more than lesser declines 52. As noted above, the slope of the path of travel can be one or both of the slope of the road section the vehicle 10 currently is on and the slope of an upcoming section of road. Further, the magnitude of an incline or decline can be considered both for the slope at one or more spots along the path of travel as well as for the distance over which the incline or decline occurs. For example, a more gradual decline (lower slope) that occurs over a longer distance can be considered of greater magnitude and favor more use of the engine brake 44 as this can be done without slowing the vehicle 10 over a longer period of time and can lead to improved energy efficiency and reduce use of the friction brakes that might otherwise be needed as the vehicle 10 gradually accelerates over the gradual, but long, decline.

Further, the presence and location of brake events (diagrammatically shown by 56 in FIG. 3) along the path of travel can be analyzed to determine if engine braking is favored or not. For example, obstacles in the road which includes but is not limited to other vehicles, turns in the road (especially turns that the system interprets as requiring a reduction in speed to manage), intersections, traffic signals/signs and other features or obstacles that are likely to cause a driver to apply the brake can be considered. These features or obstacles that may cause a brake event can be determined, for example, by the object detection sensors 34, by map data, or both. Object detection sensors 34 can detect and determine the presence and location of road signs, traffic signals, cross-streets/intersections and the like. Such things can also be included in map data that is accessible by or made available to the control system 26. If a brake event is nearby, relative to the vehicle speed or with regard to a distance threshold, then a reduction in the vehicle speed is favored and more likely to be implemented by the control system 26 because the vehicle brake is likely to be applied soon anyway so slowing the vehicle 10 down is consistent with the predicted future vehicle operation. If there is no indication of a brake event nearby/within the predetermined or threshold distance, then application of the engine brake 44 is less favored/less likely because it may be less likely to be expected or desired by the driver, and is not consistent with predicted future vehicle operation.

The terms "favored" and "likely" are relative terms. The various conditions may be rated on any desired scale, and many conditions may be separately or jointly considered. In at least some implementations, when the rating for one condition or the combined rating for multiple conditions exceeds a threshold, the engine brake 44 may be applied. For example, a decline of any magnitude might be deemed to favor engine braking and steeper declines more strongly favor engine braking and may be rated accordingly. As another example, distance to a braking event can be considered alone or along with current vehicle speed to provide a rating for engine braking, as noted herein. The magnitude of the engine brake 44 force applied can also be done based on the rating noted above. For example, a significant decline may be sufficient to cause an engine brake 44 application, and the magnitude of the engine braking applied may vary as a function of the severity of the decline and the expected result (e.g. vehicle speed control or reduction) that will be achieved by a given magnitude of engine braking. Feedback, for example data for vehicle speed and/or wheel speed(s), can be used to vary the engine braking magnitude during an engine braking event, to ensure a desired engine braking result is achieved.

Some vehicles are equipped to tow things, like trailers, that may have significant weight. The effects of road slopes (e.g. the effect of gravity on vehicle speed on inclines or declines) is greater with increased vehicle weight. That is, a vehicle 10 pulling a heavy trailer tends to speed up more on a decline than without the trailer, and vice versa on inclines. Accordingly, vehicle weight, whether the vehicle 10 is pulling something (e.g. a trailer 46, and when a trailer 46 is referred to herein it is intended to mean anything being towed by a vehicle 10) and trailer weight are factors that can be considered by the control system 26 in the decision to apply the engine brake 44, and to what extent/magnitude.

A vehicle 10 with only one occupant and no cargo loaded therein can be significantly lighter than a vehicle 10 with many occupants and cargo. To determine vehicle weight, one or more vehicle sensors may be used. For example, ride height sensors 32 may be used to determine a load on vehicle suspension components and from that, a weight can be determined or estimated. Additionally or instead, the vehicle performance can be determined and compared to a nominal performance. For example, a lighter vehicle will accelerate and brake more rapidly for a given force or energy input than will a heaver vehicle and a relative or estimated weight can be determined based on the vehicle response to driver inputs.

Similarly, the weight of a trailer 46 can be estimated by a user and input into the system such as via a smartphone app, the vehicle IVI system or otherwise. In addition to or instead, the vehicle performance can be determined and compared to a nominal vehicle performance in response to certain accelerations or braking events, as noted above. Still further, some vehicles include a connection point called a tongue for towing a trailer 46 and the tongue may include a sensor, such as an air pressure sensor. Data from the sensor can be used to estimate a weight of the trailer 46. In at least some implementations, this may be done as a function of the location of a fulcrum or axle of the trailer 46 relative to the tongue, which may be input by a user or determined or estimated with object recognition technology applied to information from an object detection sensor, such as a rear-view camera of the vehicle 10. With information about the trailer 46 considered, the control system 26 can more accurately and effectively apply the engine brake 44 in a vehicle pulling a trailer 46.

Figure 4:
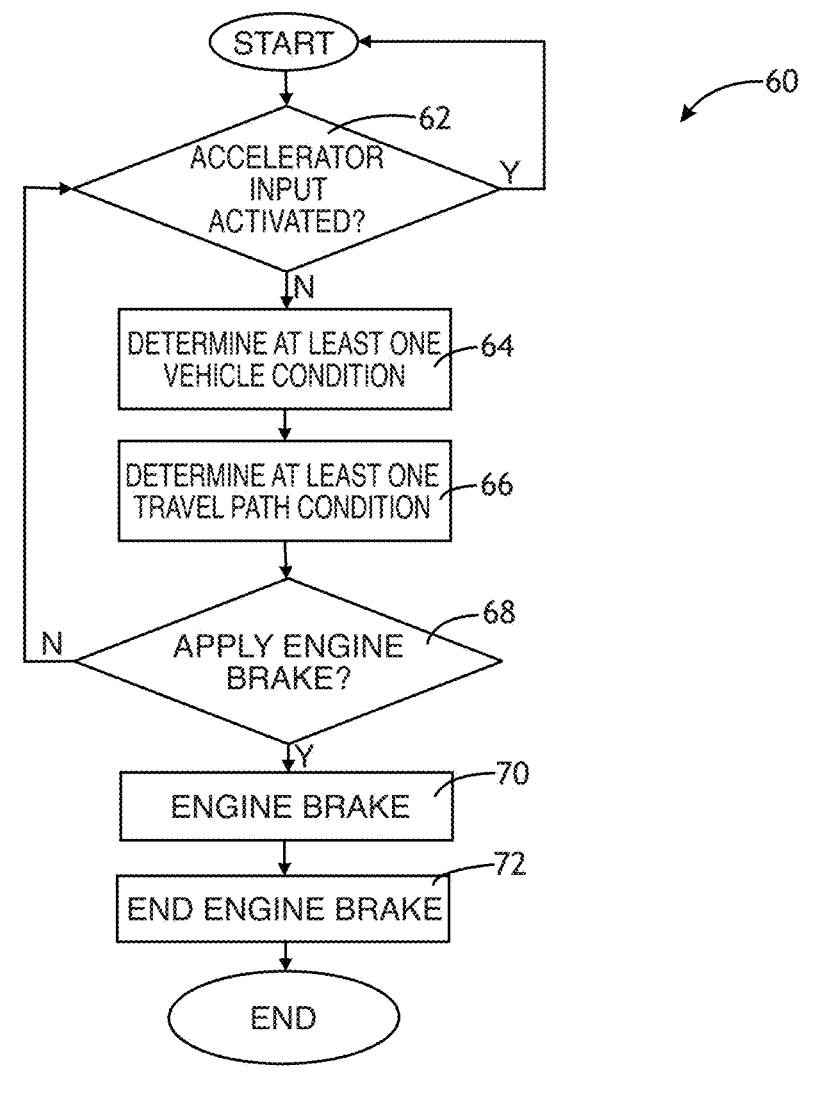
FIG. 4 is a flowchart of a method of controlling an engine brake of the vehicle.

FIG. 4 illustrates a flowchart of one implementation of a method 60 for controlling application of the vehicle engine brake 44. In step 62, the control system 26 determines whether an accelerator input 16 is being activated or not. If the accelerator input 16 is being activated, the method returns to the start and no engine brake 44 is applied.

If the accelerator input 16 is not being activated, the method continues to step 64 in which at least one vehicle condition is determined. In at least some implementations, the at least one vehicle condition is one or more of vehicle speed, whether a brake input 20 is being actuated or not, vehicle weight, and weight of a trailer 46 if the vehicle 10 is towing a trailer 46. In at least some implementations, if the brake input 20 is being actuated then the user intends to control the vehicle speed through such input and the system might end or loop back to the start without applying the engine brake 44. In at least some implementations, the engine brake 44 may be applied to assist in slowing down the vehicle 10 when the brake input 20 is being actuated. Higher vehicle speed, higher vehicle weight and/or higher combined vehicle and trailer weight tend to favor application of the engine brake 44 and these vehicle conditions can be rated and used to determine if the engine brake 44 should be applied. Other vehicle conditions may also be considered, if desired. By way of non-limiting examples, vehicle wheel speeds, fuel consumption, and performance indicators (e.g. acceleration or deceleration rates) may be considered, among other things.

Next, in step 66, the system may determine at least one path of travel condition of a road on which the vehicle 10 is traveling. In at least some implementations, the at least one path of travel condition is one or more of distance to a brake event, slope of the road the vehicle 10 currently is on and slope of the road ahead of the vehicle 10. Of course, other travel path conditions may be considered, such as but not limited to, the type of area in which the road is (e.g. city, rural, etc), the road surface characteristics (e.g. paved, gravel, wet, icy, etc), speed limits or other traffic/government regulations for the travel path, and the like.

Then, in step 68, the method may determine whether to apply the engine brake 44, and if so, the engine brake 44 may be applied in step 70 as a function of the at least one vehicle condition and the at least one path of travel condition. Sensor feedback and other inputs may be used to determine the extent/duration of the engine braking and when to end application of the engine brake in step 72. The feedback/inputs may relate to one or more vehicle conditions and one or more travel path conditions. In at least some implementations, the system is instead or also responsive to activation of the accelerator input or brake input, either of which may cause termination of the engine brake. As noted herein, one or more conditions may be rated and the rating(s) used to determine whether to apply the brake and also the parameters for application of the engine brake 44 (e.g. magnitude, duration). If it is determined in step 68 that the engine brake is not to be applied, the method may loop back to step 62 to determine if the accelerator input is being activated, and to assess whether the engine brake should be then be applied.

The engine brake 44 is not applied, in at least some implementations, when the distance to a braking event is greater than a distance threshold, and the distance threshold may change and be set as a function of the vehicle speed, and in view of the fact that it can take longer for a vehicle 10 to stop at higher speeds. In this situation, a driver may intend to coast or cruise without braking, with no predicted braking event in the near-term path of travel.

In at least some implementations, the method includes predicting an intended vehicle speed over a predetermined distance along a road to be traveled and controlling the engine brake 44 as a function of the current vehicle speed and the intended vehicle speed. The prediction may be made based on an assumed vehicle travel path or a travel path provided by a navigation system. Further, the prediction may be made in view of travel path conditions likely to be encountered along the future travel path. In at least some implementations, the engine brake 44 is not applied when the intended vehicle speed is greater than or equal to the current vehicle speed, to avoid slowing down the vehicle 10 when not desired. In at least some implementations, the engine brake 44 is not applied when the intended vehicle speed is not less than the current vehicle speed by at least a threshold speed difference. The threshold speed difference can avoid application of the engine brake 44 when the vehicle speed is closer to the predicted, intended vehicle speed, to avoid slowing down the vehicle 10 when a driver is less likely to want the vehicle 10 slowed, or to avoid slowing the vehicle 10 down too much which would cause the driver to accelerate the vehicle 10. The intended vehicle speed may be determined as a function of the distance to a next brake event along a path of travel of the vehicle 10.

In at least some implementations, the intended vehicle speed is compared to a predicted future speed that is based at least in part on the current vehicle speed and the slope of the road to be traveled over the predetermined distance, and wherein the engine brake 44 is applied when the predicted future speed is greater than the intended vehicle speed. This may help maintain the vehicle 10 at or closer to the intended vehicle speed, without unduly reducing vehicle speed beyond what a user may expect.

Further, in at least some implementations, the system may use machine learning techniques to automatically adjust condition ratings and/or the threshold(s) for one or more conditions at which the engine brake is applied. This may be done, for example, by determining when the driver overrides the engine brake application by, again for example, applying the accelerator to terminate the engine brake use and avoid or counter the speed reduction of the engine brake. The system may learn the conditions in which the driver actuates the accelerator and seek common factors from which the system can avoid future engine brake application or reduce the magnitude of engine brake application in certain situations. Additionally, the driver may apply the brake input in some situations when the engine brake is applied. The system may learn the conditions under which additional braking is desired by the driver and seek common factors that may be used to apply the engine brake in additional situations and/or to increase the magnitude of the engine brake in certain situations.

In this way, commands to apply the engine brake can be adjusted over time and in view of the vehicle conditions, road conditions and the driver preferences. The driver preferences may be directly input into the system (e.g. to choose a level, say 1 to 5, or high to low) or the driver preferences may be learned by the system over time and in view of the driver's inputs to the vehicle (e.g. accelerator input and brake input).

The systems and methods provide improved actuation of a vehicle engine brake 44 to take advantage of situations in which engine braking is desired by a driver or not unduly noticeable by a driver. The systems and methods take into account factors relating to, for example, conditions of the travel path the vehicle 10 is on and will be on, as well as vehicle conditions, so that the system is responsive and effective in a wide range of environments and conditions. The system may determine conditions in which a driver/user may wish to coast along without braking, and avoid applying the engine brake 44 in such situations or avoid applying the brake with too high of a magnitude or effect. When towing a trailer 46, the system can more accurately account for the increased weight, and ensure safe and effective control of vehicle speed under such conditions. Further, fuel economy can be improved and wear of friction brake components reduced.

What is claimed is:

1. A method of controlling engine braking in a vehicle, comprising:

determining that an accelerator input is not being activated;

determining at least one vehicle condition;

determining at least one path of travel condition of a road on which the vehicle is traveling;

applying an engine brake as a function of the at least one vehicle condition and the at least one path of travel condition; and detecting actuation of the accelerator input or a user actuated brake and then ceasing application of the engine brake.

2. The method of claim 1 wherein the at least one path of travel condition is one or more of distance to a brake event, slope of the road the vehicle currently is on and slope of the road ahead of the vehicle.

3. The method of claim 1 wherein the at least one vehicle condition is one or more of vehicle speed, vehicle weight, and approximate weight of a trailer if the vehicle is towing a trailer.

4. The method of claim 2 wherein the at least one vehicle condition is one or more of vehicle speed, vehicle weight, and approximate weight of a trailer if the vehicle is towing a trailer.

5. The method of claim 4 wherein a magnitude of engine braking is greater when the vehicle is on an incline than when the vehicle is on a decline.

6. The method of claim 4 wherein a magnitude of engine braking is less when the vehicle is at a greater distance to a braking event than when the vehicle is at a lesser distance to a braking event.

7. The method of claim 6 wherein the magnitude is zero when the distance to a braking event is greater than a distance threshold.

8. The method of claim 7 wherein the distance threshold changes as a function of the vehicle speed.

9. The method of claim 1 which also includes determining actuation of a brake input and then applying the engine brake to assist in slowing down the vehicle.

10. The method of claim 1 which includes predicting an intended vehicle speed over a predetermined distance along a road to be traveled and controlling the engine brake as a function of the current vehicle speed and the intended vehicle speed.

11. The method of claim 10 wherein the engine brake is not applied when the intended vehicle speed is greater than or equal to the current vehicle speed.

12. The method of claim 11 wherein the engine brake is not applied when the intended vehicle speed is not less than the current vehicle speed by at least a threshold speed difference.

13. The method of claim 10 wherein the intended vehicle speed is compared to a predicted future speed that is based at least in part on the current vehicle speed and the slope of the road to be traveled over the predetermined distance, and wherein the engine brake is applied when the predicted future speed is greater than the intended vehicle speed.

14. The method of claim 10 wherein the intended vehicle speed is determined as a function of the distance to a next brake event along a path of travel of the vehicle.

15. A system, comprising:

one or more vehicle sensors;

a control system that includes at least one electronic control unit, and memory including programming, the control system being in communication with the one or more vehicle sensors, and the programming arranged to:

determine that an accelerator input is not being activated;

determine at least one vehicle condition;

determine at least one path of travel condition of a road on which the vehicle is traveling; and apply an engine brake as a function of the at least one vehicle condition and the at least one path of travel condition.

16. The system of claim 15 wherein the at least one path of travel condition is one or more of distance to a brake event, slope of the road the vehicle currently is on and slope of the road ahead of the vehicle.

17. The system of claim 15 wherein the at least one vehicle condition is one or more of vehicle speed, whether a brake input is being actuated or not, vehicle weight, and approximate weight of a trailer if the vehicle is towing a trailer.

18. The system of claim 16 wherein the magnitude of engine braking is greater when the vehicle is on an incline than when the vehicle is on a decline, and wherein the magnitude of engine braking is less when the vehicle is at a greater distance to a braking event than when the vehicle is at a lesser distance to a braking event.

19. The system of claim 15 wherein the programming is also arranged to predict an intended vehicle speed over a predetermined distance along a road to be traveled and to control the engine brake as a function of the current vehicle speed and the intended vehicle speed.

* * * * *